United States Patent
Litvin et al.

(10) Patent No.: US 9,113,320 B2
(45) Date of Patent: Aug. 18, 2015

(54) TRANSFERRING AN ACCOUNT BETWEEN DEVICES

(75) Inventors: Yevgeni Litvin, Sunnyvale, CA (US); Xu Liu, San Jose, CA (US)

(73) Assignee: TangoMe, Inc., Mountain View, CA (US)

( * ) Notice: Subject to any disclaimer, the term of this patent is extended or adjusted under 35 U.S.C. 154(b) by 580 days.

(21) Appl. No.: 13/524,207

(22) Filed: Jun. 15, 2012

(65) Prior Publication Data

US 2013/0340044 A1 Dec. 19, 2013

(51) Int. Cl.
*G06F 7/04* (2006.01)
*H04W 8/20* (2009.01)
*G06F 21/41* (2013.01)
*G06F 21/60* (2013.01)
*H04W 12/06* (2009.01)

(52) U.S. Cl.
CPC .............. *H04W 8/20* (2013.01); *G06F 21/41* (2013.01); *G06F 21/606* (2013.01); *H04W 12/06* (2013.01); *G06F 2221/2115* (2013.01); *G06F 2221/2117* (2013.01)

(58) Field of Classification Search
None
See application file for complete search history.

(56) References Cited

U.S. PATENT DOCUMENTS

| | | | |
|---|---|---|---|
| 7,865,212 B2 | 1/2011 | Tysowski | |
| 8,244,223 B2 | 8/2012 | Farah | |
| 8,369,845 B2 | 2/2013 | Zou et al. | |
| 2006/0227030 A1* | 10/2006 | Clifford et al. | 341/176 |
| 2008/0171578 A1 | 7/2008 | Tysowski | |
| 2009/0037207 A1 | 2/2009 | Farah | |
| 2010/0279674 A1 | 11/2010 | Zou et al. | |
| 2010/0291912 A1 | 11/2010 | Tafarrodi et al. | |
| 2011/0076941 A1* | 3/2011 | Taveau et al. | 455/41.1 |
| 2011/0191438 A1* | 8/2011 | Huibers et al. | 709/217 |
| 2011/0270764 A1* | 11/2011 | Mizani Oskui | 705/75 |
| 2012/0117643 A1* | 5/2012 | Orr | 726/19 |

FOREIGN PATENT DOCUMENTS

EP  2400789 A1  12/2011

OTHER PUBLICATIONS

"PCT/US2013/045115 Search Report and Written Opinion", Sep. 17, 2013, 9 pages.

* cited by examiner

*Primary Examiner* — Kaveh Abrishamkar

(57) ABSTRACT

A method for transferring an account associated with a first device to a second device is disclosed. The method includes: initiating, by the second device, a message intersession with a third party device; receiving, at the second device and from a server, an indication that the second device is using a known identity associated with the first device; and providing, by the second device, an instruction for transferring an account from the first device to the second device.

14 Claims, 6 Drawing Sheets

TRANSFERRING AN ACCOUNT BETWEEN DEVICES

BACKGROUND

Presently, mobile devices are prevalently used in society. With advancements in technology, mobile devices are consistently being upgraded to include more advanced features than their predecessors. When a user purchases a new mobile phone, in many cases he/she must transfer the account information from the old mobile phone to the new mobile phone. This is typically done using the user's username/password. However, a username/password is sometimes not required to transfer account information from an old mobile phone to the upgraded mobile phone. Further, in some situations, applications on the old mobile phone are not smoothly transferred between the old mobile phone and the new upgraded mobile phone. The user may have to contact customer support for a specific application to help facilitate the transfer. This may create head-aches for the customer and take a toll on company resources. Thus, limitations exist with regard to transferring account information from old devices to upgraded devices without using the user's username/password.

DESCRIPTION OF EMBODIMENTS

Figure 1:
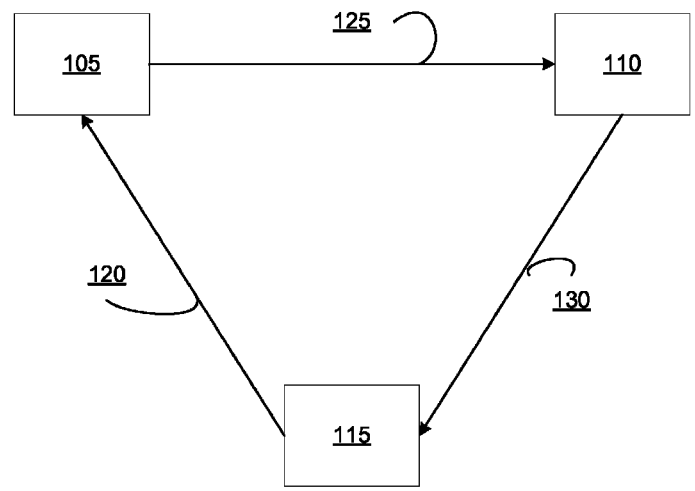
FIG. 1 shows a block diagram of a system for enabling communication between mobile devices, in accordance with an embodiment.

The drawings referred to in this description should not be understood as being drawn to scale unless specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

Overview of Discussion

Herein, various embodiments of a system and method for transferring an account associated with a first device to a second device are described. The description begins with a brief general discussion of mobile devices as well as embodiments. This general discussion provides a framework of understanding for more a particularized description which follows, focusing on particular features and concepts of operation associated with one or more embodiments of the described technology.

Currently, when a user of a device (e.g. mobile phone, tablet, PC, TV, etc.) upgrades to a new similar device, the account used with the old device is transferred to the new device by virtue of transferring the username and password of the old device's owner. In alternative circumstances, an account associated with an old device may be transferred to a new similar device without using the username and/or password. However, occasionally, an automatic account transfer without using a username and/or password is unsuccessful. In these circumstances, the user of the old and new devices may call the customer service support agent to manually transfer the account from the old device to the new device. With the ever increasing advancements in technology, proliferation of mobile devices, and the frequent upgrading thereof by customers, the "occasional" failure of account transfers increasingly utilizes more company resources.

Embodiments leverage multimedia sensors on smart phones to solve the account transfer problems mentioned above. Embodiments establish whether two devices (e.g. mobile phone, tablet, PC, TV, etc.) are located in a physical proximity with each other (e.g. same room). This knowledge of proximity between the two devices may be used in different scenarios.

For example, in one embodiment, an authorization code is passed from device "A" to device "B". More particularly, in one embodiment, device "A" (for example, a transmitter) generates an acoustic waveform using a loudspeaker. A message is encoded in the waveform using an existing signal processing technique. Device "B" (for example, a receiver) records the waveform and decodes the message. The content of the message can be used according to some application logic.

FIG. 1 is a block diagram illustrating a process of passing an authorization token from one device to another device, in accordance with an embodiment. For example, an owner of an authorized device "A" 105 initiates an authorization process for device "B" 110. As a result, a server 115 sends, at 120, an authorization code to device "A" using a digital data communication channel. Device "A" 105 then encodes the authorization code into an acoustical signal and encodes the authorization code into an acoustical waveform. Device "A" then transmits, at 125, the acoustical waveform using a loudspeaker. Device "B" receives the acoustical waveform (using a microphone), and decodes the authorization code from the waveform and sends it, at 130, to the server 115. If the entire sequence is completed successfully, the server 115 receives the authorization code from device "B" 110, establishes that devices "A" 105 and "B'" 110 are located in a proximate physical location, and authorizes device "B" to use the account of device "A" while communicating via the server 115.

In another embodiment, a "shake" method is used to verify that the owner of a new device is in the physical proximity of an old device, and is thus the owner of both devices. For example, a user holds the new device (having an accelerometer) and the old device (also having an accelerometer) together and shakes the devices vigorously. This shaking is a random movement and cannot be mimicked closely. The accelerometers in both the old and the new devices will exhibit approximately identical movement patterns. Once determined to have at least nearly identical movement patterns, it is established that the old and new devices are within physical proximity to each other. Once this physical proximity is established, the new device may be authorized to accept a transfer of the account from the old device.

Another embodiment includes a barcode scan. For example, a barcode is generated having at least the following information: a phone's unique identification (e.g. IMEI code); a user identification that uniquely identifies a registered account; a time stamp, if an account transfer is not performed with a predetermined number of minutes, the barcode will expire; and a public key. Once a barcode is scanned in, the user is directed to an account transfer web service. If the barcode is found to be genuine and not expired, then an account transfer is performed and the device that scans the barcode will be redirected to use the transferred account.

The authorization code will be successfully received by device "B" only if it is located within close physical distance from device "A". In another embodiment, it may be verified that the owner of device "A" is located physically near the owner of device "B".

Figure 2:
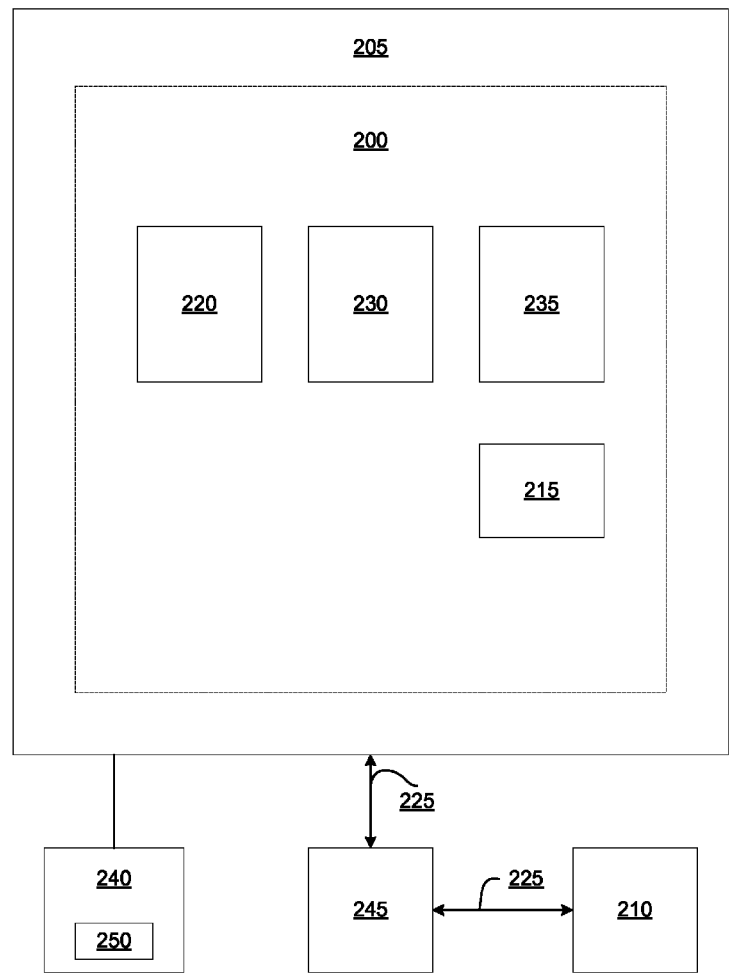
FIG. 2 shows a block diagram of a system for enabling communication between mobile devices, in accordance with an embodiment.
Figure 3:
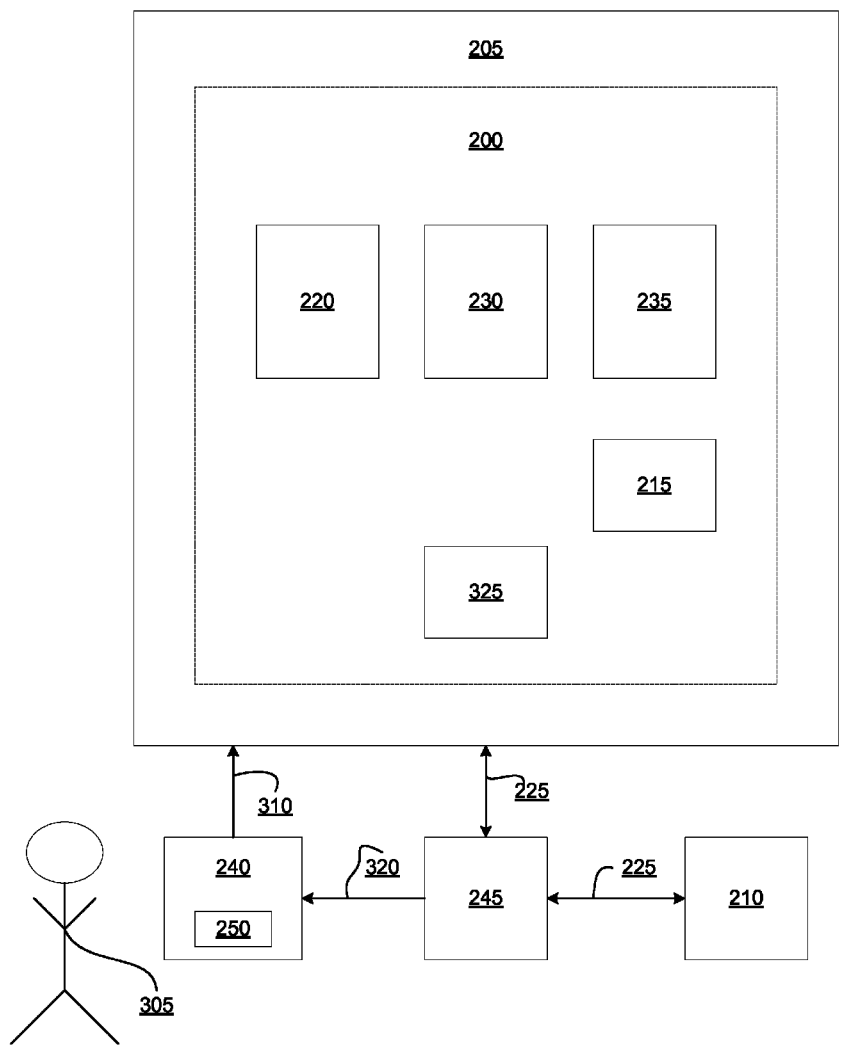
FIG. 3 shows a block diagram of a system for enabling communication between mobile devices, in accordance with an embodiment.

FIG. 2 shows a block diagram of a system 200 for transferring an account associated with a first device 240 to a second device 205, according to an embodiment. The system 200 includes the following components coupled with a computer 215: a message intersession initiator 220; a message receiver 230; and an instruction provider 235. FIG. 3 also shows a block diagram of a system 200 for transferring an account associated with the first device 240 to the second device 205, according to an embodiment. In one embodiment, the first device 240 is an authorized device (e.g. the old device) and the second device 205 is an unauthorized device (e.g. new device) that is intended to be used as a replacement for the first device 240 (e.g. old authorized device). As described herein, the first and second device, 240 and 205, respectively, may be any of, but not limited to, the following types of devices: a mobile phone; a tablet; a personal computer; a personal digital assistant; and a television.

In one embodiment, the message intersession initiator 220 initiates a message intersession 225 with a third party device 210. In one embodiment, the message intersession 225 is, but is not limited to, at least the following: a communication from the second device 205 to the third party device 210; a communication in which the second device 205 and the third party device 210 communicate with each other; and a request for a communication from the third party device 120 to the second device 205. The third party device 210 is a device that is capable of at least receiving communication from the second device 205 and may be, but is not limited to, any of the following: a mobile phone; a tablet; a personal computer; a personal digital assistant; and a television.

In one embodiment, the message intersession initiator 220 initiates the message intersession 225 via a server 245 that is coupling (wired and/or wirelessly) the second device 205 with the third party device 210.

The message receiver 230 receives, from the server 245, an indication that the second device 205 is using a known identity associated with a first device 240. In one embodiment, the known identity is an identity under which the first device 240 has been operating and is known to the server 245 to be associated with a device authorized to communicate via the server 245 with third party devices, such as the third party device 210. The server 245 recognizes that the information associated with the second device 205 (e.g. internal configuration) is not the information that the server 245 expects to see in connection with the known identity already authorized by the server 245.

In one embodiment, the message receiver 230 receives a verification request from the server 245, wherein the verification request asks a user of the second device 205 to verify that the second device 205 is different from the first device 240. The second device 205 then receives a verification selection, by the user of the second device 205, of a set of selectable selections, wherein the verification selection confirms that the second device 205 is in fact not the same as the first device 240. Thus, in one instance, the user selects (e.g. via clicking on an selectable choice on a display screen) a "verification" button, the selection of which informs the server 245 that the second device 205 is not the same as the first device 240, even though the second device 205 is using the known identity in attempting to communicate with a third party device 210.

The instruction provider 235 provides an instruction for transferring an account 250 from the first device 240 to the second device 205. The account is that set of services and information that is associated with the authorized owner of the first device 240. The authorized owner is one who is known to and acknowledged by the server 245 (or the owner of the server 245) to be enabled and authorized to use the services provided by the server 245, using the first device 240. However, as it is shown herein, while the first device 240 of the authorized user is authorized to communicate with third party devices using the services of the server 245, this ability and authorization to communicate with third party devices does not transfer to a second device 205 also owned by the authorized owner unless or until the server 245 recognizes and authorizes the second device 205 to communicate as such with third party devices.

Referring now to FIGS. 2 and 3, in one embodiment, the instruction includes a message to an authorized user of the first device to initiate an authorization process for the second device 205. This authorization process includes: contacting, by one of the first device 240 and the second device 205, the server 245 to receive an authorization code 320; in response to the contacting, receiving at one of the first device 240 and the second device 205, the authorization code 320; encoding, by one of the first device 240 and the second device 205, the authorization code 320 into one or more acoustical signals; encoding, by one of the first device 240 and the second device 205, the acoustical signals into an acoustical waveform; transmitting 310, by one of the first device 240 and the second device 205, the acoustical waveform, wherein the first device 240 is in close proximity to the second device 205; receiving, at one of the first device 240 and the second device 205, the acoustical waveform; decoding, at one of the first device 240 and the second device 205, the authorization code from the acoustical waveform to achieve a decoded authorization code 325; and sending, by one of the first device 240 and the second device 205, the decoded authorization code 325 to the server 245.

In another embodiment, the instruction includes the following steps to be performed by a user (e.g. the owner of the first device 240 and the second device 205): placing the second device 205 into a new device mode, thereby enabling a transfer of the account 250 to the second device 205; holding the first device 240 and the second device 205 together; and shaking the first device 240 and the second device 205 while holding the first device 240 and the second device 205 together. By holding the first device 240 and the second device 205 together, it is meant that the two devices are held such that when they are shaken, they shake at the same rate and direction. As explained herein, the first device 240 and the second device 205, in one embodiment, have accelerometers therein. The shaking of the first device 240 and the second device 205 will create a first accelerometer pattern and a second accelerometer pattern, respectively. (It should be appreciated that the shake can occur at a vigorous speed, or at a slow speed. However, the greater the shake speed, the more accurate the results will be.) These accelerometer patterns are compared with each other. If the patterns substantially match, then the first device 240 and the second device 205 are determined to be deliberately placed in close proximity with each other, by the authorized user. By substantially match, it is meant that the two accelerometer patterns are the same or nearly the same. Once it is determined that the first device 240 and the second device 205 are deliberately placed in close proximity with each other, the server 245 receives its verification that the authorized owner of the first device 240 should be authorized to use the account 250 associated with the first device 240 in order to communicate via the server 245 with third party devices. The server 245 then enables a transfer of the account 250 from the first device 240 to the second device 205. Additionally, in one embodiment, if the accelerometer patterns are measured to be at a velocity that does not meet or exceed a threshold velocity, then these measurements may be disregarded as invalid and hence, not considered by the server 245 in determining a verification.

In one embodiment, the instruction includes the following steps to be performed by a user (e.g. the owner of the first device 240 and the second device 205): taking a picture, by the second device 205, of a bar code displayed by the first device 240; and sending, by the second device 205, the bar code to the server 245. In yet another embodiment, the instruction includes the following steps to be performed by a user (e.g. the owner of the first device 240 and the second device 205): taking a picture, by the first device 240, of a bar code displayed by the second device 205; and sending, by the first device 240, the bar code to the server 245.

In one embodiment, the bar code includes any information to be shared between any of the first device 240, the second device 205, and the server 245. In one embodiment, the bar code includes a unique identification code (e.g. IMEI code, a user identification that uniquely identifies a registered account, a public key, etc.) of either first device 240 or the second device 205. In another embodiment, the bar code includes a time stamp requiring a transfer of the account 250 to the second device 205 within a predetermined time period. For example, once the picture is taken by either the first device 240 or the second device 205 of the bar code on either the first device 240 or the second device 240, the server 245 is limited to a predetermined time period, such as 20 seconds), in which to transfer the account 250 from the first device 240 to the second device 205. The term transfer, in the context of transferring the account 250, refers to associating the account 250 with the information associated with the second device 205. In one embodiment, the server 245 verifies that the bar code is genuine and not expired. It the bar code is determined to be genuine and not expired, the server 245 transfers the account 250 from the first device 240 to the second device 205.

Figure 4A:
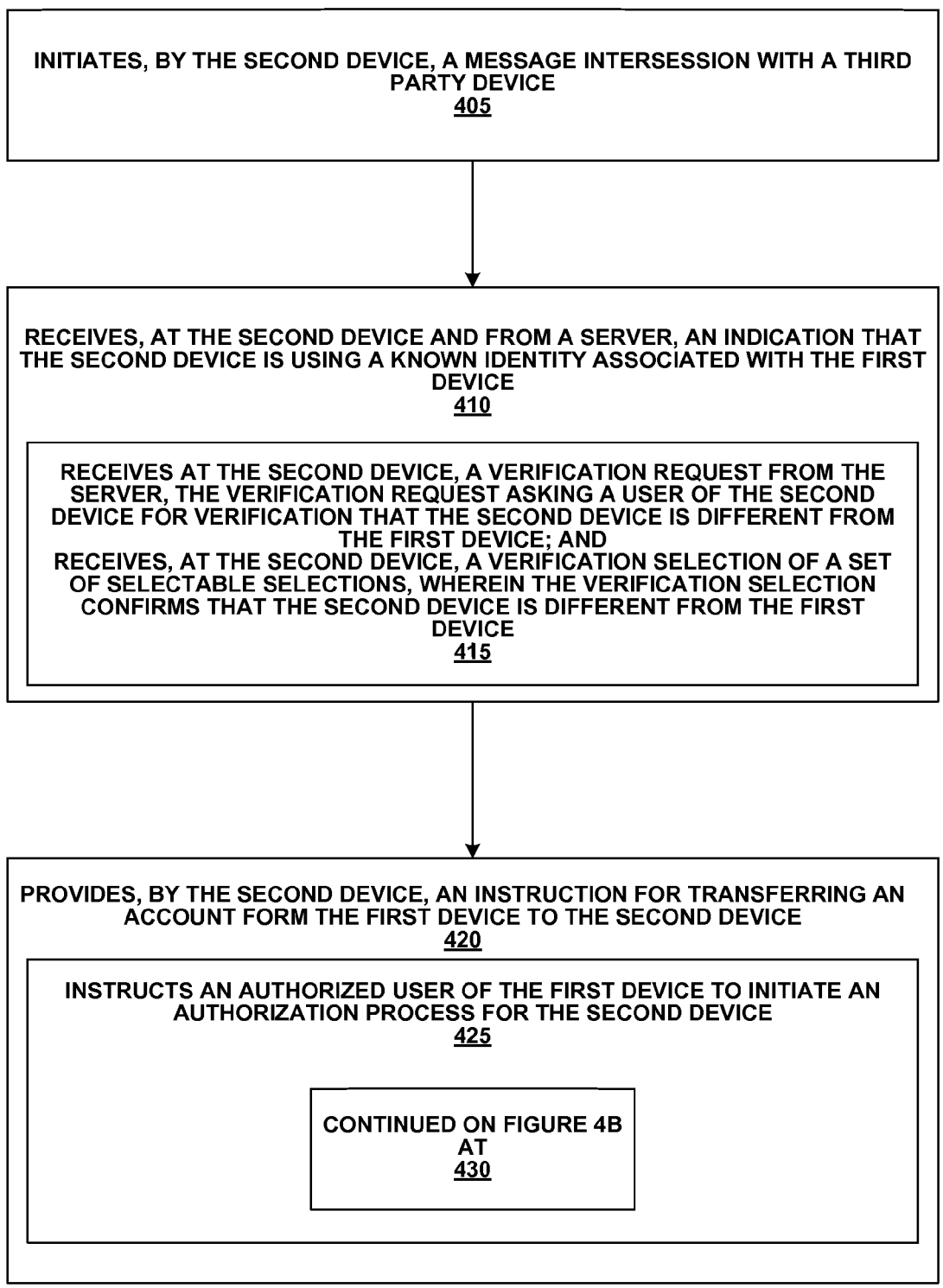
FIGS. 4A-4C show a flow chart for performing a method for enabling communication between mobile devices, in accordance with an embodiment.
Figure 4B:
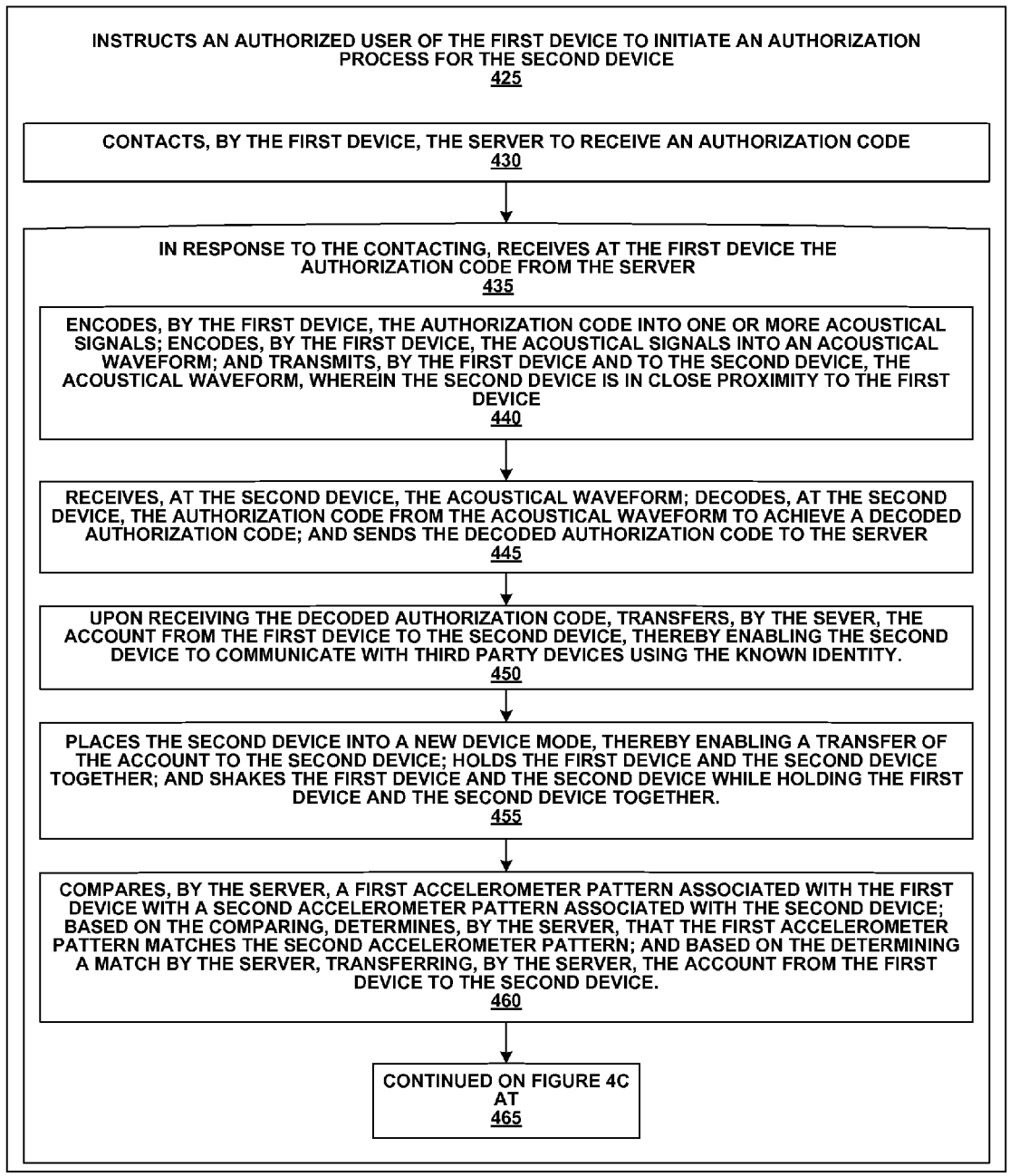
Figure 4C:
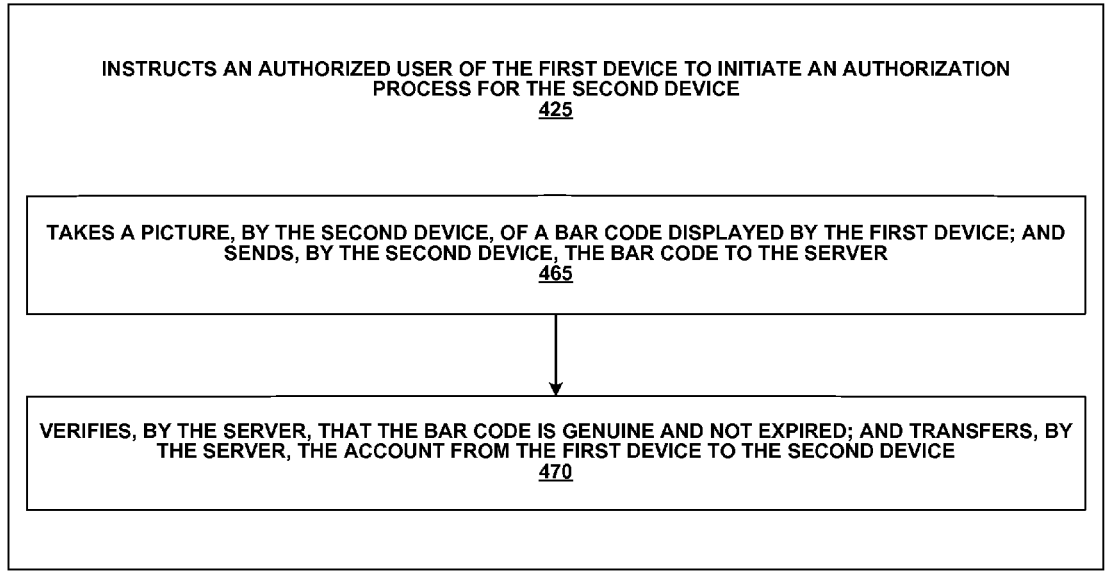

FIGS. 4A-4C show a flow chart of an example method for transferring an account associated with a first device 240 to a second device 205, in accordance with an embodiment. In various embodiments, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 400 is performed in parts by the first device 240, the second device 205 and components thereof and the server 245.

Referring now to FIGS. 1-4C, at 405, in one embodiment and as discussed herein, a second device 205 initiates a message intersession with a third party device 210.

At 410, in one embodiment and as discussed herein, the second device 205 receives from the server 245, an indication that the second device 205 is using a known identity associated with the first device 240. At 415, in one embodiment and as discussed herein, the receiving at 410 includes: receiving, at the second device 205, a verification request from the server 245, wherein the verification request asks a user of the second device 205 to verify that the second device 205 is different from the first device 240; and receiving, at the second device 205, a verification selection of a set of selectable selections, wherein the verification selection confirms that the second device 205 is different from the first device 240.

At 420, in one embodiment and as discussed herein, the second device 205 provides an instruction for transferring an account 250 from the first device 240 to the second device 205. At 425, in one embodiment and as described herein, the providing an instruction at 420 includes instructing an authorized user of the first device 240 to initiate an authorization process for the second device 205.

At 430, in one embodiment and as discussed herein, the instructing at 425 includes contacting, by one of the first device 240 and the second device 205, the server 245 to receive the authorization code 320.

At 435, in one embodiment and as discussed herein, the instruction at 425 includes, in response to the contacting at 430, one of the first device 240 and the second device 205 receives the authorization code 320 from the server 245. In one embodiment, the receiving the authorization code 320 at 435 is performed using a digital data communication channel.

At 440, in one embodiment and as discussed herein, the method 400 at 435 (receiving at the first device 240 the authorization code 320) further includes the following: encoding, by one of the first device 240 and the second device 205, the authorization code 320 into one or more acoustical signals; encoding, by one of the first device 240 and the second device 205, the acoustical signals into an acoustical waveform; and transmitting, by one of the first device 240 to the second device 205 and the second device 205 to the first device 240, the acoustical waveform, wherein the second device 205 is in close proximity to the first device 240.

At 445, in one embodiment and as discussed herein, the method 400 at 440 further includes: receiving, at one of the first device 240 and the second device 205, the acoustical waveform; decoding, at one of the first device 240 and the second device 205, the authorization code 320 from the acoustical waveform to achieve the decoded authorization code 325; and sending, by one of the first device 240 and the second device 205, the decoded authorization code 325 to the server 245.

At 450, in one embodiment and as discussed herein, the method 400 at 445 further includes: upon receiving the decoded authorization code 325, transferring, by the server 245, the account 250 from the first device 240 to the second device 205, thereby enabling the second device 205 to communicate with third party devices, such as third party device 210, using the known identity.

At 455, in one embodiment and as discussed herein, the authorization process at 425 includes: placing the second device 205 into a new device mode, thereby enabling a transfer of the account 250 to the second device 205; holding the first device 240 and the second device 205 together; and shaking the first device 240 and the second device 205 while holding the first device 240 and the second device 205 together. At 460, in one embodiment and as discussed herein, the method 400 at 455 further includes: comparing, by the server 245, a first accelerometer pattern associated with the first device 240 with a second accelerometer pattern associated with the second device 205; based on the comparing, determining, by the server 245, that the first accelerometer pattern matches the second accelerometer pattern; and based on the determining a match by the server 245, transferring, by the server 245, the account 250 from the first device 240 to the second device 205.

At 465, in one embodiment and as discussed herein, the authorization process at 425 includes: taking a picture, by one of the first device 240 and the second device 205, of a bar code displayed by the first device 240; and sending, by one of the first device 240 and the second device 205, the bar code to the server 245. In one embodiment, the bar code includes information to be shared between any of the first device 240, the second device 205, and the server 245. In one embodiment and as discussed herein, the bar code is generated by at least one of the following methods: a unique identification code of the first device 240; a user identification that uniquely identifies a registered account; a time stamp requiring a transfer of the account 250 to the second device 205 within a predetermined time period; and a public key.

At 470, in one embodiment and as discussed herein, the authorization process at 465 further includes: verifying, by the server 245, that the bar code is genuine and not expired; and transferring, by the server 245, the account 250 from the first device 240 to the second device 205.

Thus, embodiments enable the user to easily facilitate an account transfer from the user's old authorized device to the user's new device, without having to contact customer support for assistance. Further, embodiments save resources in reducing the workload of customer assistance units by providing a way for customers to transfer their own account, if needed.

All statements herein reciting principles, aspects, and embodiments of the technology as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present technology, therefore, is not intended to be limited to the embodiments shown and described herein. Rather, the scope and spirit of present technology is embodied by the appended claims.

The invention claimed is:

1. A non-transitory computer readable storage medium having stored thereon, computer-executable instructions that, when executed by a computer, cause said computer to perform a method for transferring an account associated with a first device to a second device, wherein said method comprises:
when said first device is located in a physical proximity of said second device, initiating, by said first device and with a server, an authorization process for said second device to use said account, wherein said first device is considered an authorized device by said server;
receiving, at said first device and from said server, an authorization code via a digital data communication channel;
encoding said authorization code into an acoustical waveform; and
transmitting said acoustical waveform via a loud speaker to said second device, wherein when said second device decodes said acoustical waveform and sends the decoded acoustical waveform to said server, said server establishes that said first device and said second device are located within a proximate physical location and then authorizes said second device to use said account while communicating with said server.

2. The non-transitory computer readable storage medium of claim 1, further comprising:
receiving an instruction from said second device to initiate said authorization process for said second device.

3. The non-transitory computer readable storage medium of claim 2, wherein said authorization process comprises:
contacting said server, by said first device, to receive said authorization code.

4. The non-transitory computer readable storage medium of claim 2, wherein said authorization process comprises:
instruction comprises:
placing said first device into a mode that enables a transfer of said account to said second device;
holding said first device and said second device together; and
shaking said first device and said second device while holding said first device and said second device together.

5. The non-transitory computer readable storage medium of claim 4, wherein said instruction further comprise:
comparing, by said server, a first accelerometer pattern associated with said first device with a second accelerometer pattern associated with said second device;
based on said comparing, determining, by said server, that said first accelerometer pattern matches said second accelerometer pattern; and
based on said determining a match by said server, transferring, by said server, said account from said first device to said second device, wherein said transferring makes said account available for use by said second device.

6. The non-transitory computer readable storage medium of claim 2, wherein said:
instruction comprises:
taking a picture, by said first device, of a bar code displayed by said second device; and
sending, by said first device, said bar code to said server.

7. The non-transitory computer readable storage medium of claim 6, wherein said bar code comprises information to be shared between any of said first device, said second device, and said server.

8. A system for transferring an account associated with a first device to a second device, wherein said system comprises:
a message intersession initiator coupled with a computer, said message intersession initiator configured for, wherein said first device is located in a physical proximity of said second device, initiating, by said first device and with a server, an authorization process for said second device to use said account, wherein said first device is considered an authorized device by said server;
a message receiver coupled with said computer, said message receiver configured for receiving, from said server, an authorization code via a digital data communication channel;
an encoder coupled with said computer, said encoder configured for encoding said authorization code into an acoustical waveform; and
a transmitter coupled with said computer, said transmitter configured for transmitting said acoustical waveform via a loud speaker to said second device, wherein when said second devcie decodes said acoustical waveform and sends the decoded acoustical waveform to said server, said server establishes that said first device and said second device are located within a proximate physical location and then authorizes said second device to use said account while communicating with said server.

9. The system of claim 8, wherein said second device is an unauthorized device.

10. The system of claim 8, further comprising:
an instruction receiver coupled with said computer, said instruction receiver configured for receiving an instruction from said second device to initiate said authorization process for said second device, wherein said authorization process comprises:
contacting, by said first device, said server to receive said authorization code.

11. The system of claim 10, wherein said instruction comprises:
placing said first device into a new device mode, thereby enabling a transfer of said account to said second device;
holding said first device and said second device together; and
shaking said first device and said second device while holding said first device and said second device together.

12. The system of claim 10, wherein said instruction comprises:
taking a picture, by said first device, of a bar code displayed by said first second device; and
sending, by said first device, said bar code to said server.

13. The system of claim 12, wherein said bar code comprises:
information to be shared between any of said first device, said second device, and said server.

14. The system of claim 10, wherein said instruction comprises:
taking a picture, by said first device, of a bar code displayed by said second device, wherein said bar code comprises information to be shared between any of said first device, said second device, and said server; and
sending, by said first device, said shared information to said server.

* * * * *

UNITED STATES PATENT AND TRADEMARK OFFICE
CERTIFICATE OF CORRECTION

PATENT NO.       : 9,113,320 B2
APPLICATION NO.  : 13/524207
DATED            : August 18, 2015
INVENTOR(S)      : Yevgeni Litvin and Xu Liu Page 1 of 1

It is certified that error appears in the above-identified patent and that said Letters Patent is hereby corrected as shown below:

In the Claims:

Column 8, Claim 6, Line 36: Delete "said:"

Insert -- said --

Column 8, Claim 8, Line 65: Delete "devcie"

Insert -- device --

Column 10, Claim 12, Line 6: Delete "first"

Signed and Sealed this
Twenty-third Day of August, 2016

Michelle K. Lee
*Director of the United States Patent and Trademark Office*